United States Patent [19]

Cornelison

[11] Patent Number: 4,637,568
[45] Date of Patent: Jan. 20, 1987

[54] MANDREL FOR WINDING FLEXIBLE METAL CATALYST CORE

[76] Inventor: Richard C. Cornelison, 6587 State Rte. 82, Hiram, Ohio 44234

[21] Appl. No.: 760,498

[22] Filed: Jul. 30, 1985

[51] Int. Cl.$^4$ .............................................. F01N 3/28
[52] U.S. Cl. .................................. 242/68.5; 242/7.21; 422/180; 502/439; 502/527
[58] Field of Search ............... 422/202, 204, 180, 222; 502/527, 439; 242/68.5, 68.6, 118.3, 7.21; 138/109, 155; 29/33 S; 165/177

[56] References Cited

U.S. PATENT DOCUMENTS

| | | | |
|---|---|---|---|
| 2,887,456 | 5/1959 | Halford et al. | 502/527 X |
| 4,014,962 | 3/1977 | del Notario | 165/177 X |
| 4,031,745 | 6/1977 | McCarty | 138/109 X |
| 4,282,186 | 8/1981 | Nonnenmann | 422/180 |
| 4,529,139 | 7/1985 | Smith | 242/7.21 |

Primary Examiner—Stuart S. Levy
Assistant Examiner—Katherine Matecki
Attorney, Agent, or Firm—R. A. Sturges

[57] ABSTRACT

There is provided a mandrel for winding a thin metal catalyst support useful in an automobile catalytic converter said mandrel having a circular central cross section and bilaterally extending arms along a common axis, each arm having an oval cross section continuously changing in the same manner at corresponding points along each arm away from the central cross section to a terminal oval section having final major and minor diameters.

5 Claims, 7 Drawing Figures

MANDREL FOR WINDING FLEXIBLE METAL CATALYST CORE

This invention relates as indicated to a mandrel for winding a flexible metal catalyst core, and more particularly to a mandrel which provides a predetermined geometrical configuration to a catalyst core member when a pair of metal strips, one of which is flat and the other which is corrugated, or a single nonnesting corrugated strip is spirally wound thereon.

BACKGROUND OF THE INVENTION AND PRIOR ART

The present invention is in the field of catalyst cores which are especially adapted for use with automotive vehicles to control the chemistry of exhaust emissions. Since the early 1970's, manufacturers of automotive vehicles powered by internal combustion engines whether of the spark ignited or compression ignited type, have been required to treat the exhaust gases from such engines in such a manner as to eliminate undesirable atmosphere polluting chemicals such as unburned hydrocarbons, carbon monoxide, nitrogen oxides, and the like. Up to the present time, this has been achieved largely with catalytic converters which are composed of a shell and one or more catalytic cores contained therein. The catalytic core has, for the most part been a extruded ceramic core having a plurality of longitudinally extending holes therethrough much like a honeycomb. On the interior surfaces of the honeycomb there has been deposited a suitable catalytic material which on contacting exhaust gases at the elevated temperatures thereof reduces or eliminates the undesirable chemicals contained in the exhaust gases.

More recently, and for reasons of economy and durability efforts have been made to utilize as a catalytic support, thin metal strips which are corrugated in a manner such as when wound they provide continuous apertures extending through the length of the core. In such devices, it is essential that the corrugated metal not "nest" whereby well defined ports or openings are closed off. The inner surface of the openings is coated with a catalyst such as palladium or platinum or a combination thereof, which catalysts act in the environment to convert carbon monoxide, for example to carbon dioxide, to enchance the burning of unburned hydrocarbons, and to convert nitrous oxides to nitrogen and oxygen.

The wound, or in some cases folded, metal catalyst supports introduce a problem not experienced with cast ceramic supports. Because of the extreme number of pulsations to which such thin metal foil catalyst support is submitted in the course of its use, such wound or folded metal catalyst supports tend to move in response to such pulsation whereby convolutions of spirally wound thin metal catalyst support, or adjacent folds of a folded catalyst support, for example, will move axially in response to the pulsing flow of gases in an exhaust pipe. Such telescoping of the catalyst support eventually destroys the mechanical integrity of the device.

The present invention provides a method for solving the problem of axial translation of convolutions of a spirally wound thin metal catalyst support.

Reference may be had to the patents to Retallick U.S. Pat. No. 4,301,039; 4,350,617; 4,402,871 which disclose various forms of metal foil configurations for supporting a catalyst material. Referance may also be had to U.S. Pat. No. 4,300,956 which discloses cowound interelated layers of corrugated and noncorrugated Fecralloy Sheets. U.S. Pat. No. 4,318,888 discloses a wound corrugated metal foil wherein one surface carries a platinum catalyst and the facing surface separately carries a palladium catalyst for concurrently treating gases flowing therethrough. Such metal foils or combined foils may be used in the practice of the present invention and accordingly the disclosures of those patents are incorporated herein by reference.

Various means for locking in place folded or spirally wound metal foil supported catalyst members have been suggested including projections extending inwardly from the housing to engage slots or the like in the foil bodies. However, these are not entirely satisfactory and very often reduce the open area as, for example, in the case of a grid or spider disposed transversely of the housing and in contact with each end of the catalyst body.

I have now found that axial translation of convolutions of a spirally wound thin metal foil catalyst carrier can be prevented by conducting such winding about a mandrel having a special and novel configuration. The final wound product has a configuration as a result of winding under tension about a mandrel of the present invention which is oval on each end and circular in the center, the major and minor axes of one end being displaced angularly from the major and minor axes of the opposite end.

BRIEF STATEMENT OF THE INVENTION

Briefly stated, the present invention is in a mandrel for winding a thin metal catalyst support, such as those described in the prior art which mandrel has a circular central portion, and bilaterally extending arms along a common axis, each arm having an oval cross section continuously changing in a symmetrical manner along each arm in a direction away from a central portion to a terminal oval section having final major and minor axes, the major and minor axes axially along one of said arms being angularly displaced, preferably 90°, from the major and minor axes at corresponding axial positions along the other of said arms. Outwardly axially extending flat sections may be provided beyond the oval arms at one or both ends, preferably the latter, to provide means for gripping the mandrel for winding of the metal foil member or members in a spiral fashion thereabout. The planes in which the major and minor axes appear are perpendicular to the longitudinal axis of the mandrel.

BRIEF DESCRIPTION OF THE DRAWINGS

The invention may be better understood by having reference to the annexed drawings wherein.

DETAILED DESCRIPTION OF THE DRAWINGS

Figure 1:
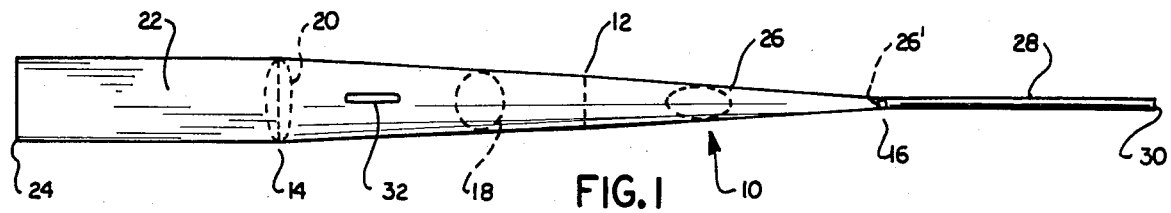
FIG. 1 is a side elevation of a mandrel in accordance with the present invention.
Figure 2:
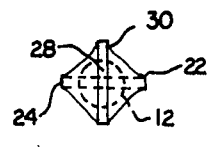
FIG. 2 is an end view of the mandrel shown in FIG. 1.
Figure 2A:
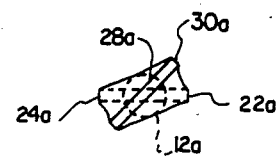
FIG. 2A is an end view of another mandrel having a different angular displacement of the arms, e.g., 45°.

Referring now more particularly to FIGS. 1, 2 and 2A, there is shown in side and end elevations respectively a mandrel in accordance with the present invention. The mandrel is conveniently formed from a tubular member of circular cross section and may be formed of stainless steel able to resist the high temperatures of a catalytic converter which range in general from about 1,000° to 1,800° F. As indicated above, the central section 12 of the mandrel 10 is generally circular in cross section. The width of the corrugated metal strip having the catalyst deposited thereon and being wound about the mandrel shown in FIG. 1 has a width equivalent to the distance between the points indicated at 14 and 16. As one proceeds from the central section 12 toward the point 14, the minor diameter of the oval indicated at 18 gradually decreases along a straight line and the major diameter of the oval 18 gradually increases along a straight line until the configuration indicated at 20 is achieved at end 14. The outwardly axially extending end portion 22 proceeding from the point 14 to the extremity 24 is simply flattened and the opposite inner sides of the oval 20 brought into contact. On the opposite end of the structure shown in FIG. 1, major axis and minor axis of the oval 26 as shown in FIG. 2 are displaced 90° from the major and minor axis of the oval at 18 and the oval at 14 until the final minor dimension of the oval 26 is achieved at the end 16. In the same manner as indicated for the left hand end of the mandrel shown in FIG. 1, the right hand portion 28 is outwardly axially extending and is flattened out to its extremity 30 again for convenience in providing means for gripping the mandrel at each end to facilitate winding or cowinding of the thin metal catalyst support thereabout. A slot such as the slot 32 may be provided to accept a tab from one end of the metal foil catalyst support. A similar slot would be provided on the right hand side, not shown. The flattened portions 22 and 28 may later be cut off after winding, if desired. The diameter of the tube before forming is, for best results, between 0.5 and 1.0". After locating the center 12, the tube is merely progressively squeezed along its axis until final closing is reached at 14 and 16. For best results, the profile presented to the foil or foils during winding is a straight line from end 14 to end 16 at each point in the revolution of the device 10 about its longitudinal axis. The foil(s) will not accept readily a concave or convex profile without introducing windind distortion.

While I have shown my preferred embodiment in the drawings wherein the flat portions 22 and 28 are angularly displaced by 90°, displacements between 45° (FIG. 2A) and 90° may also be used. The smaller the deviation frm 90° displacement the more resistant the spirally wound member will be to axial displacement of the convolutions.

Figure 3:
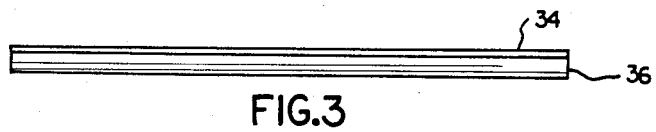
FIG. 3 is an end view of a composite metal strip of a flat strip and a corrugated strip useful in forming catalytic core members.
Figure 4:
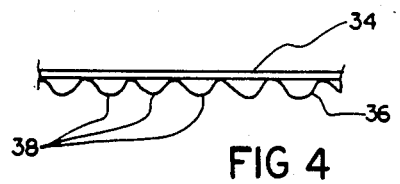
FIG. 4 is a fragmentary side view of the member shown in FIG. 3.

FIG. 3 is an end view illustration of a two-member cowound metal foil catalyst support. Thus, there is provided a thin iron flat strip 34 and an underlying corrugated strip 36 having corrugations 38 formed therein as shown in FIG. 4. The metal strips 34 and 36 are 0.0015" to four thousandths thick and may be cowound and rendered catalytically active as described in U.S. Pat. No. 4,300,956.

Figure 5:
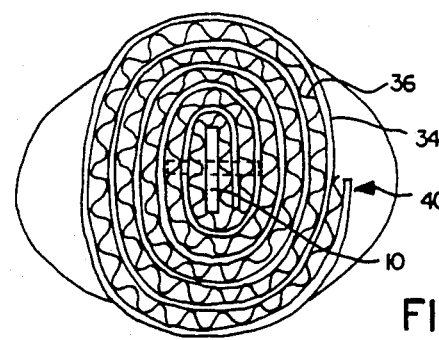
FIG. 5 is an end view of a spirally wound two component composite metal foil catalyst support wound about the mandrel of FIG. 1.

FIG. 5 shows a catalytic core member in end view having a composite cowound flat and corrugated strips such as shown in FIGS. 3 and 4 spirally wound about the mandrel 10. The mandrel 10 is rotated about its longitudinal axis. Winding is desirably carried out under tension of from 10 to 100 pounds force exerted at the end of the strip, e.g., a 4 to 10 inch wide strip. Winding is continued until a major diameter of the desired length is obtained and a minor diameter of desired dimension is obtained. A typical major diameter is 4¼" and a typical minor diameter is 3.5". The free external end of the foil catalyst support may then be secured by any suitable temporary means to expose surface of the underlying convolution of the spiral winding 40, a portion of which is shown in FIG. 5.

Figure 6:
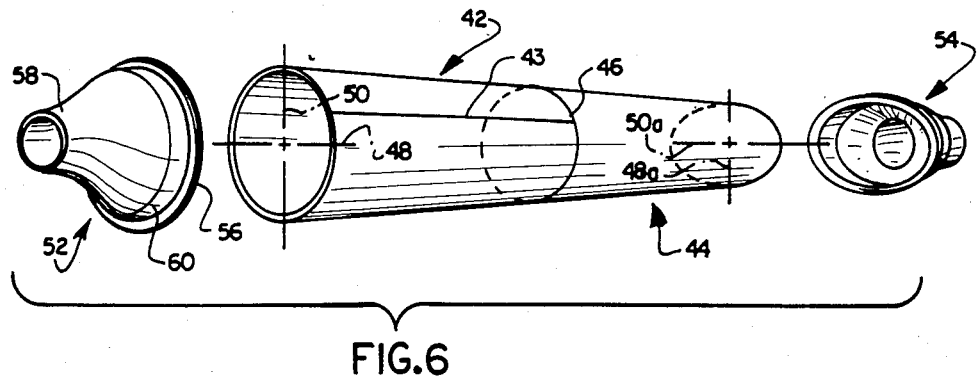
FIG. 6 is an exploded perspective view of a housing for containing the spirally wound catalytically active member shown in FIG. 5.

The completed device of FIG. 5 is then disposed in a suitable similarly configured outer shell such as shown in FIG. 6. FIG. 6 shows in exploded form a suitable container for the structure shown in FIG. 5. The housing is applied to the catalytic converter member of FIG. 5 in two longitudinally split pieces, 42 and 44 split along the line 43, for example, and which have a generally circular cross section at the joining line 46. The shell members 42 and 44 are each formed in a die to provide, for example, in portion 42 a minor diameter along the line 48 of, for example, 3.5" and a major diameter along the line 50 of 4.25". As indicated the configuration at 46 is a circle. At the opposite end in section, 44, the portion at the left end defining the circle is of the same diameter as the diameter of the circular portion of the portion 42. Thus, the parts 42 and 44 can be welded together along the line indicated by the line 46 and the shells closed by welding along its longitudinal seam, e.g., sea 43. At the opposite end, the major diameter is indicated by the line 50a and the minor diameter by the line 48a. It will be observed that the lines 48a and 58a are displaced 90° from the position of the corresponding major and minor diameters 48 and 50, respectively. The device is then closed with suitable end caps 52 and 54 which are welded in place and the sections 42 and 44 welded along the longitudinal seams, e.g., seam 43. End cap 52, for example, has an oval opening at its proximal extremity 56 adapted to fit within the oval described by the confronting end of the portion 42. The end cap 52 is fitted with a sleeve portion 58 adapted to coact with an exhaust pipe of an automotive vehicle. The proximal extremity is also provided with a flange 60 which is radially outwardly extending from the proximal end 56. As indicated above, this fits inside the oval described by the open confronting end of the portion 42 and provides a suitable structure for welding to the structure 42. In similar manner, an equivalently shaped oval end cap 64 is rotated 90° about its longitudinal axis and is secured at the opposite end. When welded into position, the core member such as shown in FIG. 5 is securely held within the shell and provides a unit which may be inserted in the exhaust line of an automotive vehicle. Because of the structure and the 90° relationship of the portions of the winding, the respective convolutions of the spiral winding are prevented from axial movement one with respect to the adjacent convolution. It should be noted from FIG. 5 that the mandrel 10 is firmly embedded and captured within the spiral winding 34 and because of the geometry of the structure, it cannot be removed and therefore becomes an integral part of the catalyst support structure.

Spiral winding of the type contemplated by the present invention has the advantage that it is considerably less expensive than, for example, reverse folding of a corrugated strip member back and forth upon itself to form a built up accordion type structure. By winding the devices in the manner shown, the convolutions of the spiral winding are under tension from the inside out, and this further assists in preventing axial translation of on convolution with respect to the next.

What is claimed is:

1. A mandrel for winding a thin metal catalyst support about its longitudinal axis, said mandrel having a circular central cross section and bilaterally extending arms along a common axis, each arm having an oval cross section continuously changing in a symmetrical manner along each arm, respectively, in a direction away from the circular central cross section to a terminal oval section having a final major and minor diameter, the major and minor diameters axially along one of said arms being angularly displaced from the major and minor diameters at corresponding axial positions along the other of said arms.

2. A mandrel as defined in claim 1 further characterized by at least one flat section outwardly axially extending from the terminal oval section.

3. A mandrel as defined in claim 2 having opposing flat sections outwardly axially extending from each terminal oval section.

4. A mandrel as defined in claim 1 wherein the major and minor diameters of said arms, respectively are angularly displaced by 90° of from the major and minor diameters at corresponding axial positions along said arms.

5. A mandrel as defined in claim 1 wherein the major and minor diameters of said arm, respectively, are angularly displaced by 45° from the major and minor diameters at corresponding axial positions along said arms.

* * * * *